United States Patent
Likins

(10) Patent No.: US 11,793,340 B2
(45) Date of Patent: *Oct. 24, 2023

(54) REVOLVING CLUSTER MAILBOX AND CENTRAL PACKAGE DELIVERY SYSTEM

(71) Applicant: Clarence Brent Likins, Goshen, KY (US)

(72) Inventor: Clarence Brent Likins, Goshen, KY (US)

(73) Assignee: Clarence Brent Likins, Goshen, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/543,301

(22) Filed: Dec. 6, 2021

(65) Prior Publication Data

US 2022/0087463 A1 Mar. 24, 2022

Related U.S. Application Data

(63) Continuation of application No. 16/727,430, filed on Dec. 26, 2019, now Pat. No. 11,191,382.

(51) Int. Cl.
*A47G 29/12* (2006.01)
*A47G 29/126* (2006.01)
(Continued)

(52) U.S. Cl.
CPC ....... *A47G 29/1201* (2013.01); *A47G 29/124* (2013.01); *A47G 29/126* (2013.01);
(Continued)

(58) Field of Classification Search
CPC ............ A47G 29/1201; A47G 29/1209; A47G 29/124; A47G 29/126; A47G 29/141;
(Continued)

(56) References Cited

U.S. PATENT DOCUMENTS

| 894,577 A | 7/1908 | Bessner |
| 1,534,920 A | 4/1925 | Cox |

(Continued)

FOREIGN PATENT DOCUMENTS

| CN | 204599834 | 9/2015 |
| CN | 106672596 | 5/2017 |

(Continued)

OTHER PUBLICATIONS

Government of India, Examination Report Issued in Application No. 202247040879, 6 pages, dated Aug. 10, 2022.

(Continued)

*Primary Examiner* — William L Miller
(74) *Attorney, Agent, or Firm* — Gray Ice Higdon

(57) ABSTRACT

Present embodiments relate to a revolving mailbox cluster and central package delivery system. More specifically, without limitation, present embodiments relate to a revolving mailbox cluster that includes: substantially circular layers stacked vertically, where a second layer sits atop a first layer, and wherein each substantially circular layers includes: vertically opposed bottom top plates, divider plates perpendicular to the bottom and top plates, and a center ring, where the bottom and top plates, dividers, and center ring define individual mailbox units, each of which has an opening disposed opposite the center ring; a first motor for moving the substantially circular layers vertically; and a second motor for rotating the substantially circular layers.

11 Claims, 12 Drawing Sheets

(51) Int. Cl.
*A47G 29/124* (2006.01)
*A47G 29/14* (2006.01)

(52) U.S. Cl.
CPC ..... *A47G 29/1209* (2013.01); *A47G 29/1218* (2013.01); *A47G 29/141* (2013.01); *A47G 2029/149* (2013.01)

(58) Field of Classification Search
CPC .... A47G 29/14; A47G 29/16; A47G 29/1207; A47G 29/1218; A47G 29/1248; A47G 2029/148; A47G 2029/149; A47G 2029/145; A47B 49/00; A47B 49/004; G06Q 10/0836; G06Q 10/0832; B65D 25/04
USPC ............... 232/17, 19, 24, 25, 45; 312/249.2; 705/339; 220/507; 206/425; 340/569; 248/131
See application file for complete search history.

(56) References Cited

U.S. PATENT DOCUMENTS

| | | | |
|---|---|---|---|
| 1,605,118 | A | 11/1926 | Kolstad |
| 1,642,806 | A | 9/1927 | Choate |
| 4,067,459 | A | 1/1978 | Rozengauz et al. |
| 4,509,676 | A | 4/1985 | Stacy |
| 4,651,921 | A | 3/1987 | Mckellar |
| 5,042,686 | A | 8/1991 | Stucki |
| 5,088,604 | A | 2/1992 | Baur et al. |
| 5,405,077 | A | 4/1995 | Damon |
| 6,003,761 | A | 12/1999 | Chapman |
| 8,123,113 | B1 | 2/2012 | Hartman |
| 8,145,351 | B2 | 3/2012 | Schininger et al. |
| 8,428,775 | B2 | 4/2013 | Baker et al. |
| 9,120,624 | B1 | 9/2015 | Cassady et al. |
| 9,296,560 | B2 | 3/2016 | Fukushima |
| 9,504,344 | B2 | 11/2016 | Sarvestani |
| 9,745,130 | B1 | 8/2017 | Rawal |
| 9,833,097 | B2 | 12/2017 | Byers et al. |
| 10,114,996 | B2 | 10/2018 | Lossov et al. |
| 10,624,484 | B1 | 4/2020 | Mountford et al. |
| 10,835,070 | B2 | 11/2020 | Russell |
| 10,888,189 | B2 | 1/2021 | Pointeau |
| 11,312,573 | B2 * | 4/2022 | Schedlbauer ...... G06Q 10/0836 |
| 11,633,058 | B2 * | 4/2023 | Sun .................... G07F 11/1653 232/43.1 |
| 2002/0121543 | A1 | 9/2002 | Simmons |
| 2010/0153310 | A1 | 6/2010 | Huebler |
| 2013/0264381 | A1 | 10/2013 | Kim et al. |
| 2015/0317596 | A1 | 11/2015 | Hejazi |
| 2016/0235236 | A1 | 8/2016 | Byers et al. |
| 2016/0257423 | A1 | 9/2016 | Martin |
| 2019/0125116 | A1 | 5/2019 | Russell |
| 2019/0135433 | A1 | 5/2019 | Goovaerts et al. |
| 2019/0325683 | A1 | 10/2019 | Tovey et al. |

FOREIGN PATENT DOCUMENTS

| | | |
|---|---|---|
| CN | 108288329 | 7/2018 |
| CN | 109222601 | 1/2019 |
| EP | 4081076 | 11/2022 |
| GB | 971944 | 10/1964 |
| IN | 202247040879 | 7/2022 |
| WO | 2018154526 | 8/2018 |

OTHER PUBLICATIONS

International Search Report and Written Opinion issued for Application PCT/US2020/066641 dated Mar. 8, 2021.

* cited by examiner

# REVOLVING CLUSTER MAILBOX AND CENTRAL PACKAGE DELIVERY SYSTEM

BACKGROUND

Present embodiments relate to a revolving cluster mailbox and central package delivery system. More specifically, without limitation, present embodiments relate to a cylindrical revolving mailbox cluster and central package delivery system which utilizes one or more layers, each divided into a plurality of receiving units for mail, packages, and the like.

Metropolitan areas are increasingly looking to cluster mailboxes to improve efficiency of mail delivery; this is particularly true for residential areas where conventionally much time is spent walking or driving between homes. Traditional cluster mailboxes are boxes taking up a large amount physical space. Furthermore, traditional cluster mailboxes often require a user to exit their vehicle and use a physical key to retrieve their mail or packages.

Therefore it is desirable to increase the number of units within a physical space, while simultaneously making the cluster mailbox more user friendly.

The information included in this Background section of the specification, including any references cited herein and any description or discussion thereof, is included for technical reference purposes only and is not to be regarded subject matter by which the scope of the invention is to be bound.

SUMMARY

The present application provides one or more of the features recited in the appended claims and/or the following features which alone or in any combination, may comprise patentable subject matter.

Present embodiments relate to a revolving cluster mailbox and central package delivery system (referred to herein as simply "revolving cluster mailbox"). In an aspect, the revolving cluster mailbox includes: a plurality of substantially circular layers stacked vertically, where a second layer sits atop a first layer, and where each of the plurality of substantially circular layers includes: a bottom plate and a top plate, where the bottom plate and the top plate are vertically opposed; a plurality of divider plates that are perpendicular to the bottom and the top plates; and a center ring; where the bottom plate, the top plate, the plurality of dividers, and the center ring define an plurality of individual mailbox units, each individual mailbox unit with an opening disposed opposite the center ring; a first motor configured to move the plurality of substantially circular layers vertically; and a second motor configured to the rotate the substantially circular layers.

In some embodiments, the revolving cluster mailbox additional includes a user interface and a controller coupled to the first and second motors and configured to activate the first or second motors in response to an input to the user interface.

In some embodiments, the first and second motors are step motors. In other embodiments, the first and second motors are hydraulically actuated.

In some embodiments, each of the plurality of substantially circular layers has a diameter of about 80 inches. In some embodiments, the first layer of the plurality of substantially circular layers is divided, by the plurality of dividers, into 30 of the plurality of individual mailbox units. In other embodiments, the first layer of the plurality of substantially circular layers is divided, by the plurality of dividers, into eight of the plurality of individual mailbox units. In some embodiments, a distance between the bottom plate and the top plate is six inches. In embodiments, a distance between the bottom plate and the top plate is 14 inches.

In another aspect, a revolving cluster mailbox system includes: an enclosure with at least one window and at least one user interface; at least one revolving mailbox assembly contained within the enclosure, where the at least one revolving mailbox cluster includes: a plurality of substantially circular layers stacked vertically, each divided into a plurality of individual mailbox units, where each of plurality of individual mailbox units includes an opening; a first motor configured to move the plurality of substantially circular layers vertically; and a second motor configured to the rotate the substantially circular layers; and a controller coupled to the first and second motors and configured to activate the first or second motors in response to a user-initiated input to the controller.

In some embodiments, the user-initiated input is a signal from a remote device. In other embodiments, the user-initiated input is through the user interface. In some embodiments, the controller is configured to: receive, from a remote cloud service, a signal; and troubleshoot, in response to the signal, the system.

In some embodiments, the revolving cluster mailbox system additionally includes: a window motor configured to move the at least one window from a closed position to an open position, where the controller is coupled to the window motor and configured to activate the window motor in response to a user-initiated input to the controller.

In some embodiments, the enclosure is a drive-up shelter and further comprises a roof overhang configured to protect a user from the elements. In some such embodiments, the enclosure further includes: at least one rooftop window disposed above a top layer or the plurality of substantially circular layers; a window motor configured to move the at least one rooftop window from a closed position to an open position, where the controller is coupled to the window motor and configured to activate the window motor in response to a signal from a drone interface. In some embodiments, the enclosure further includes one or more conveyor belts disposed proximate the one or more rooftop windows configured to move a parcel from the one or more rooftop windows to one of plurality of individual mailbox units of the top layer or the plurality of substantially circular layers.

In yet another aspect, a revolving cluster mailbox system includes: an enclosure including: at least one window; at least one user interface; and at least one window motor configured to move the at least one window from a closed position to an open position; at least one revolving mailbox contained within the enclosure, where the at least one revolving mailbox cluster includes: a plurality of substantially circular layers stacked vertically, each divided into a plurality of individual mailbox units, where each of plurality of individual mailbox units includes an opening; a first motor configured to move the plurality of substantially circular layers vertically; and a second motor configured to the rotate the substantially circular layers; and a controller coupled to the first and second motors and the at least one window motor, where the controller is configured to: activate, in response to a to a user-initiated input, the first or second motors in response; position, using the first or second motors, a user defined individual mailbox unit of the plurality of individual mailbox units proximate the at least one window; and activate, in response to a to the user-initiated input, the window motor to move the at least one window a closed position to an open position.

In some embodiments, the user-initiated input is a signal from a remote device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of a revolving cluster mailbox will now be described by way of examples. These embodiments are not to limit the scope of the claims as other embodiments of the revolving cluster mailbox will become apparent to one having ordinary skill in the art upon reading the instant description. Non-limiting examples of the present embodiments are shown in the figures.

DETAILED DESCRIPTION

Figure 1:
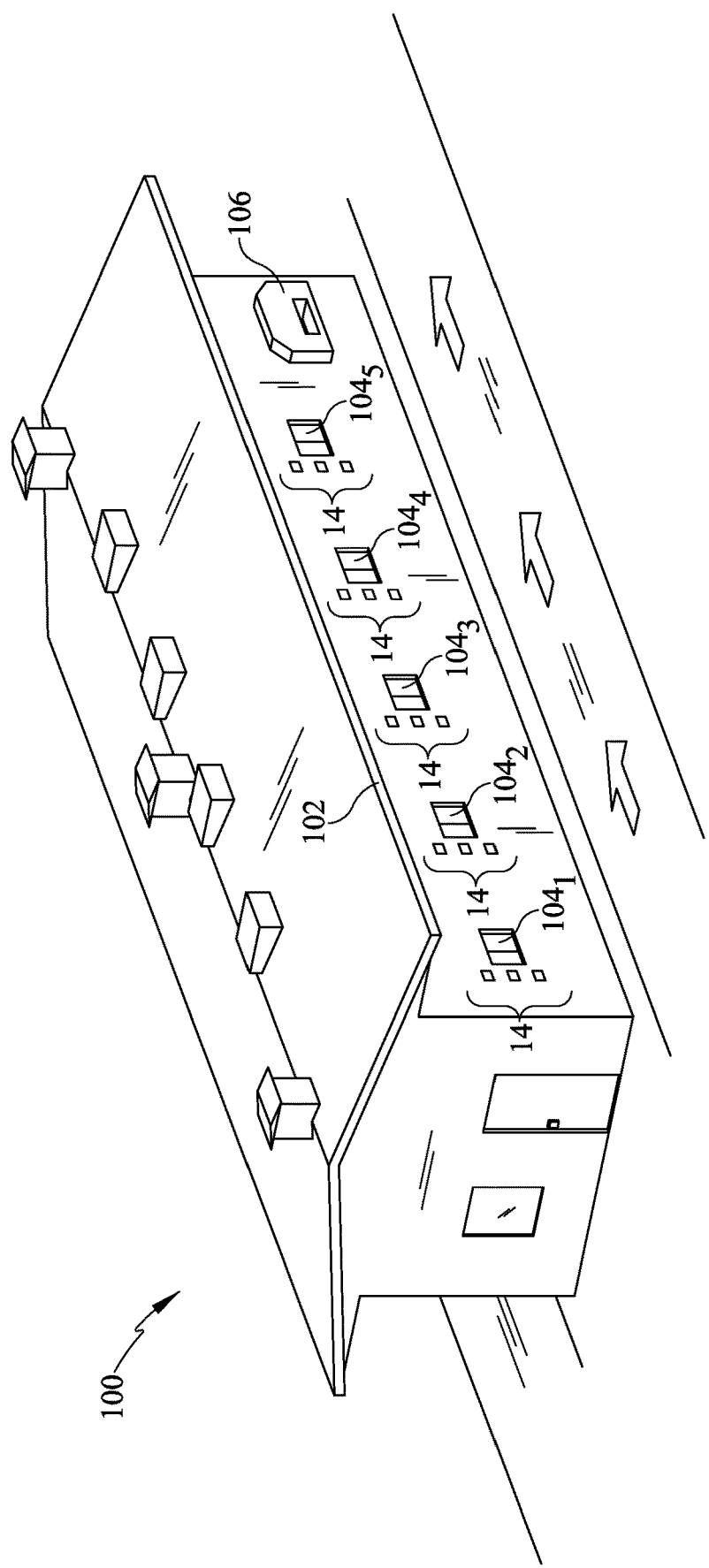
FIG. 1 is a perspective view of a shelter containing a plurality of revolving cluster mailboxes and central package delivery systems consistent with some embodiments described herein.
Figure 2:
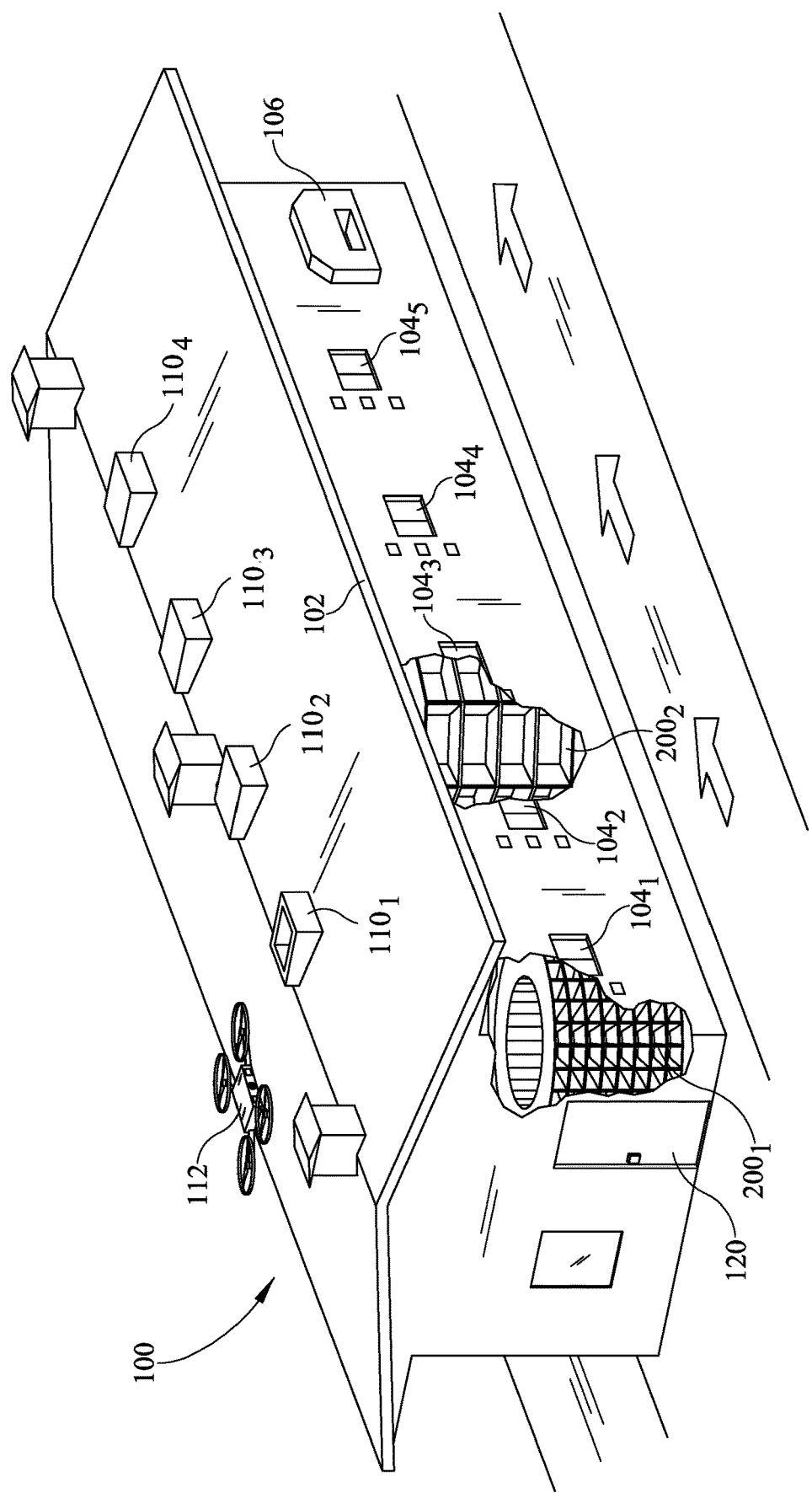
FIG. 2 is a cut away view of the shelter of FIG. 1 illustrating the revolving cluster mailboxes contained therein consistent with some embodiments described herein.
Figure 3:
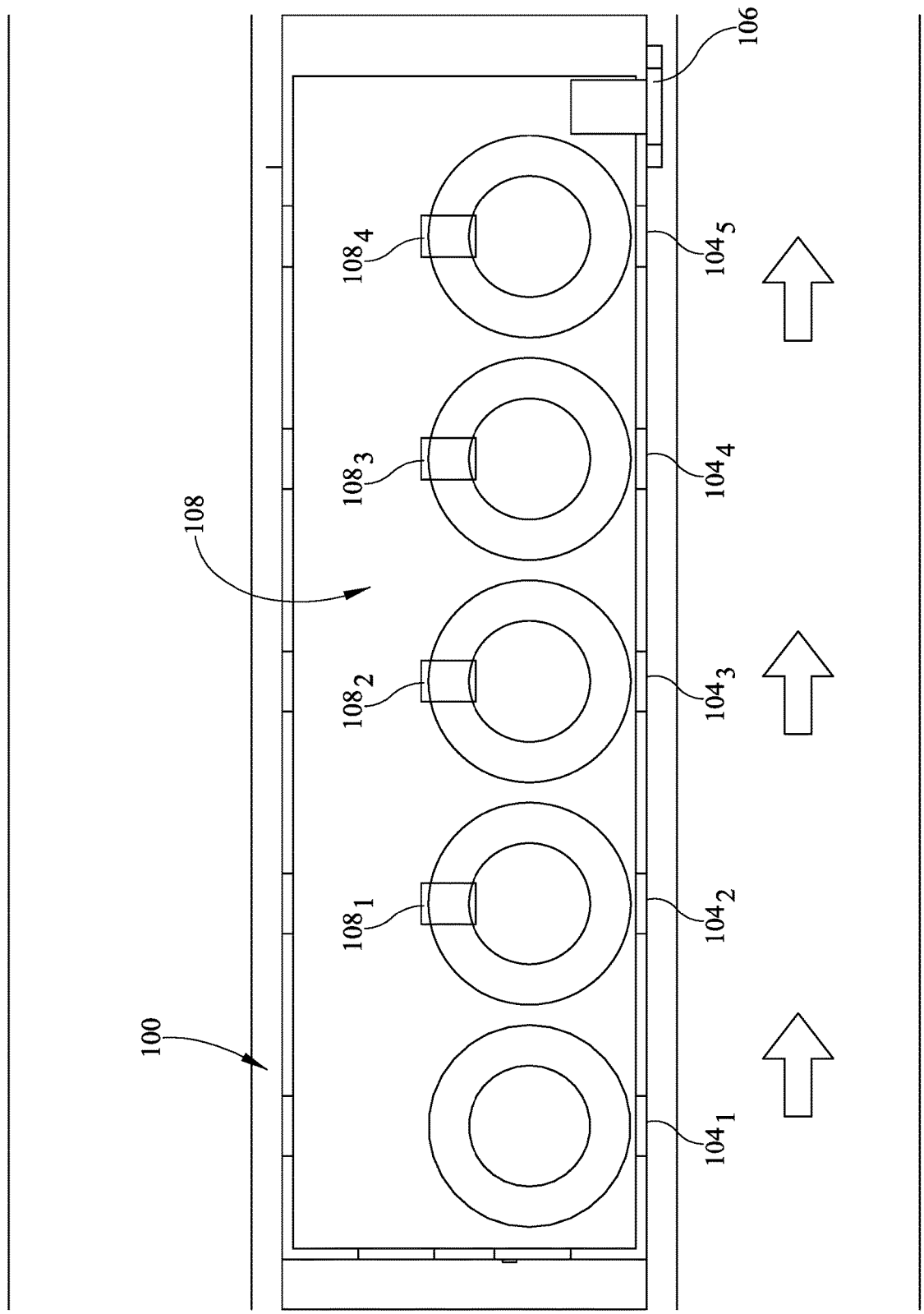
FIG. 3 is a top view of the interior of the shelter and revolving cluster mailboxes and central package delivery systems contained therein of FIG. 1 consistent with some embodiments described herein.
Figure 4:
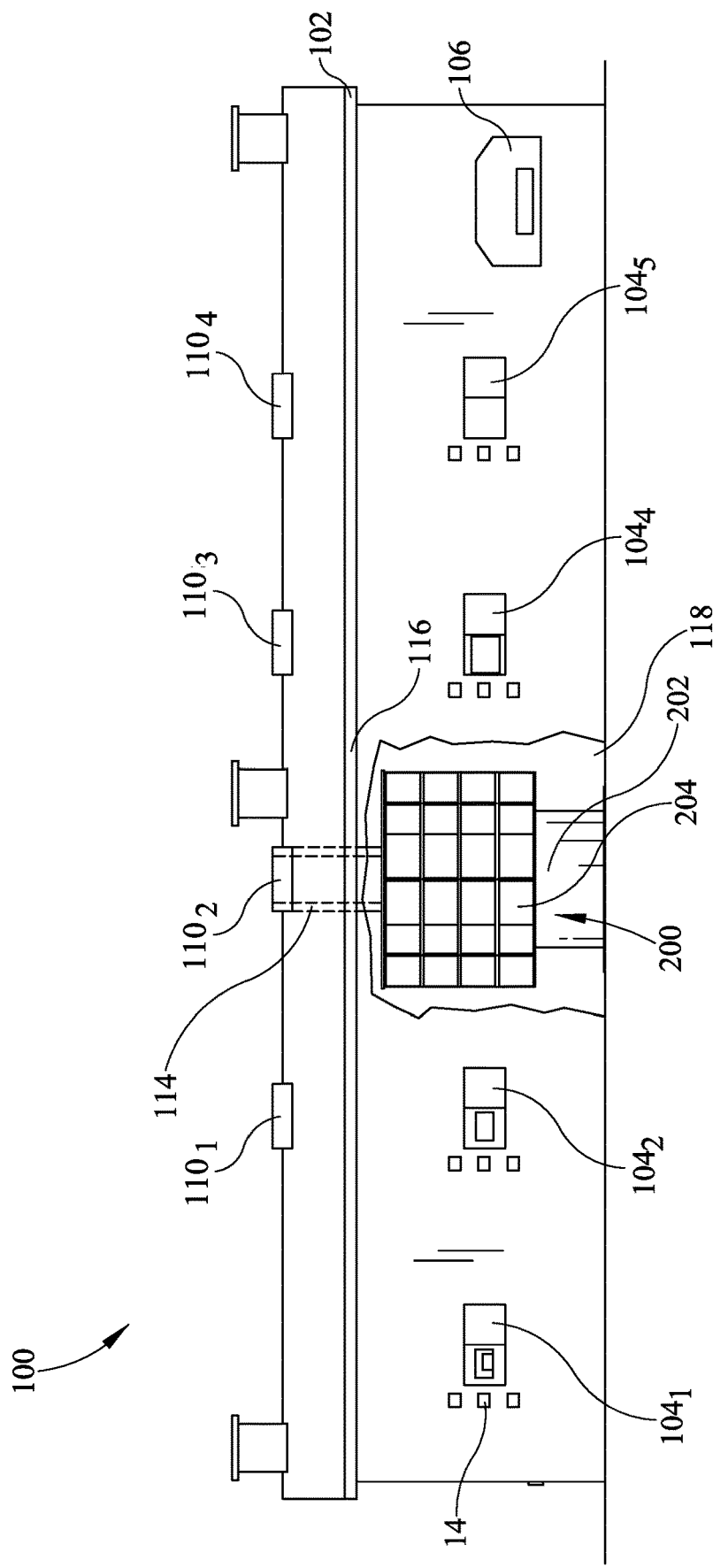
FIG. 4 is a front view of the shelter containing the revolving cluster mailboxes and central package delivery systems of FIG. 1 consistent with some embodiments described herein.

It is to be understood that a revolving cluster mailbox and central package delivery system (referred to herein an "revolving cluster mailbox") is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Where used herein, and not otherwise defined, the term "mailbox" is intended to be broadly construed as a receptacle for mail through the U.S. Postal Service, as well as parcels from the same or any number of other parcel services (e.g. United Parcel Services, FedEx, DHL, Amazon, etc.).

With reference to FIGS. 1-4, an embodiment of a shelter 100 containing at least one revolving cluster mailbox $200_{1-n}$ is provided. As illustrated, the shelter 100 may be designed as a "drive-up" shelter, such that a user may access their unit without leaving their vehicle. For example, as illustrated in FIG. 1, there may be a path (marked by the arrows) on one side of the shelter 100 for a user to drive through. The shelter 100 may also include, in some instances, a roof overhang 102 large enough to protect a user from the elements. The shelter 100 may include at least one openable window $104_{1-n}$. In some instances, the shelter 100 may include a window $104_{1-n}$ for each revolving cluster mailbox $200_{1-n}$. In some embodiments, the window $104_{1-n}$ may slide horizontally from side to side to open; while in other embodiments, the window $104_{1-n}$ may slide vertically up and down to open. The window $104_{1-n}$ may automatically open in response to user input, as described with reference to FIG. 5. The shelter may also include a drop box 106 where users may deposit outgoing mail. Although illustrated on the same side of the shelter 100 as the windows $104_{1-n}$ this is not intended to be limiting; in other instances, the drop box 106 may be positioned near the loading zone 108 (described in detail herein) or anywhere else found to be convenient.

The shelter 100 may additionally, in some instances, include one or more additional openable rooftop windows $110_{1-n}$ capable of receiving mail, parcels, etc. via drone 112 delivery. In such instances, a drone 112 may hover over the openable rooftop window 110, which open in response to the drone (e.g. through a wireless signal such as an RFID signal, WiFi signal, cellular signal, etc.). Once the rooftop window 110 is open, the drone 112 may deposit the mail, parcel, etc. into one or more units of top layer (illustrated in greater detail with respect to FIGS. 5-8) aligned with the rooftop window 110. In some instances, the shelter 100 may additionally include one or more conveyor belts $114_{1-n}$ (e.g. with wheels) extending between the openable rooftop windows $110_{1-n}$ to the one or more units of top layer in order to facilitate the movement of the mail, package to the proper location. The rooftop window 110 may then close, for example, after a preprogrammed amount of time has passed or after a second signal from the drone 112 is sent indicating the delivery is complete.

The shelter 100 may, in some embodiments, be completely enclosed and protected from the elements, as illustrated in FIGS. 1-4. In such embodiments, there may be an access door 120 to provide access to the loading zone 108. In some instances, this access door 120 may be a controlled access door, such that only postal service or various delivery company personnel have access to the loading zone 108. However, this is not intended to be limiting, as in other instances, the shelter 100 may only be partially enclosed; however in such instances, the revolving cluster mailbox $200_{1-n}$ may have doors (not illustrated) closing each individual mailbox unit 204. The loading zone 108 may be an open area where postal service or various delivery company personal have ample space to move around and access each mailbox unit 204.

The shelter 100 is not limited to the size and shape illustrated in FIGS. 1-4, as one of skill in the art would recognize that the size, shape, aesthetic features, and so on of the shelter 100 may be dependent on various factors, including the number of individual mailbox units unit $204_{1-n}$ required. Furthermore, the number of units $204_{1-n}$ required may vary based on the size of the residential development. Furthermore, the aesthetic design, including but not limited to the size and shape of the windows $104_{1-n}$, the exterior design of the shelter 100 (e.g. brick, sliding, or the like), etc. may be dictated by home owners' association guidelines.

Figure 5:
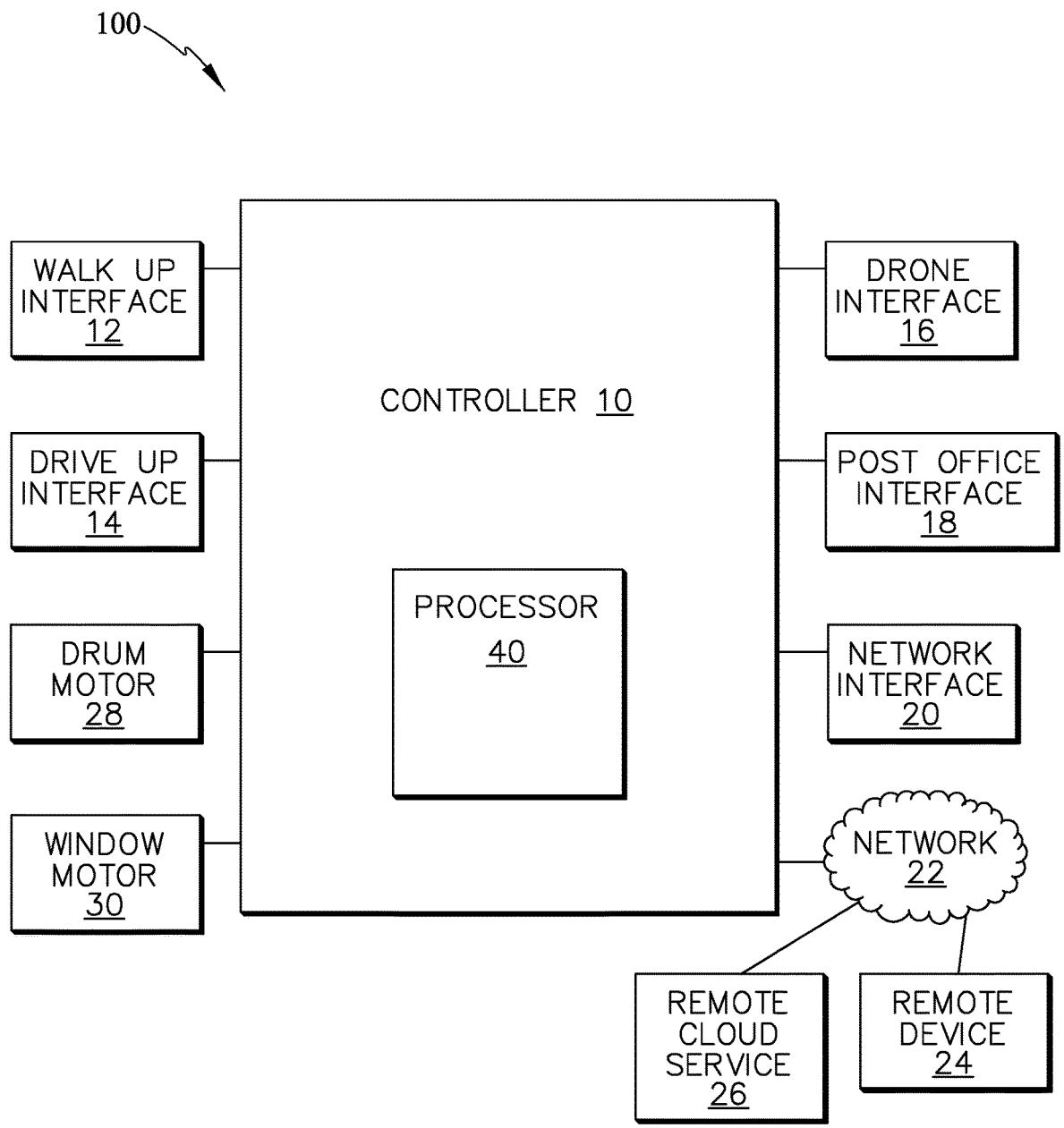
FIG. 5 is a block diagram of an example control system for the shelter containing a revolving cluster mailboxes and central package delivery systems of FIG. 1.

Now turning to FIG. 5, the shelter 100 containing one or more revolving cluster mailboxes $200_{1-n}$ may be under the control of a controller 10 that receives inputs from a number of components and drives a number of components in response thereto. Controller 10 may, for example, include one or more processors 40 and a memory (not shown) within which may be stored program code for execution by the one or more processors. The memory may be embedded in controller 10, but may also be considered to include volatile and/or non-volatile memories, cache memories, flash memories, programmable read-only memories, read-only memories, etc., as well as memory storage physically located elsewhere from controller 10, e.g., in a mass storage device or on a remote computer interfaced with controller 10.

As shown in FIG. 5, controller 10 may be interfaced with various components, including a walkup user interface 12 (not illustrated in FIGS. 1-4), a drive up user interface 14, a drone interface 16, a postal service user interface 18, and so on. Moreover, in some embodiments, controller 10 may also be coupled to one or more network interfaces 20, e.g., for interfacing with one or more remote devices 24 via wired and/or wireless networks 22 such as RFID, Ethernet, Bluetooth, NFC, cellular and other suitable networks. As used herein, the term "user interface" may include a keypad, touchscreen, one or more knobs, dials, or the like. "User interface" may also refer to a user-initiated signal from a remote device to the controller.

In an example, as illustrated in FIG. 5, one of the remote devices 24 may be a remote cloud service 26 coupled in network 22. In some instances, the remote cloud service 26 may, for example, include a component for administration or troubleshooting of the system remotely. Furthermore, the remote cloud service 26 may, in some instances, allow for additional users (e.g. postal customers) to be remotely added or deleted by an administrator.

Additional components may also be interfaced with controller 10, as will be appreciated by those of ordinary skill having the benefit of the instant disclosure. Moreover, in some embodiments, at least a portion of controller 10 may be implemented externally from the shelter 100, e.g., within a mobile device, a cloud computing environment, etc., such that at least a portion of the functionality described herein is implemented within the portion of the controller that is externally implemented.

The controller 10 may also in some instances, be interfaced with a plurality of motors 28 for controlling the movement of each revolving cluster mailbox 200. For example, as described in detail with respect to FIGS. 6-9, a first motor may be configured to move the revolving cluster mailbox 200 vertically (e.g. to raise and lower), and a second motor may be configured to rotate the revolving cluster mailbox 200 about an axis 202 extending from the roof or top 116 of the shelter 100 to the floor or bottom 118 of the shelter 100. The controller 10 may also in some instances, be interfaced with a plurality of window motors 30 for controlling the movement of the window $104_{1-n}$ for each revolving cluster mailbox 200.

In some embodiments, controller 10 may operate under the control of an operating system and may execute or otherwise rely upon various computer software applications, components, programs, objects, modules, data structures, etc. In addition, controller 10 may also incorporate hardware logic to implement some or all of the functionality disclosed herein. Further, in some embodiments, the sequences of operations performed by controller 10 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

FIG. 5 illustrates an example control system for a shelter 100 containing one or more revolving cluster mailboxes $200_{1-n}$ described herein; however, it is to be understood that the location of the controller is not limited to the shelter 100 itself. In some embodiments, the controller may be disposed in a mobile computing device, server, or other device wirelessly connected to the shelter 100. Moreover, multiple devices, e.g., an embedded device in the shelter 100 and a device networked thereto such as a mobile computing device may collectively implement the functions of controller 10, with different operations performed by the different devices alone or jointly with one another.

Figure 6:
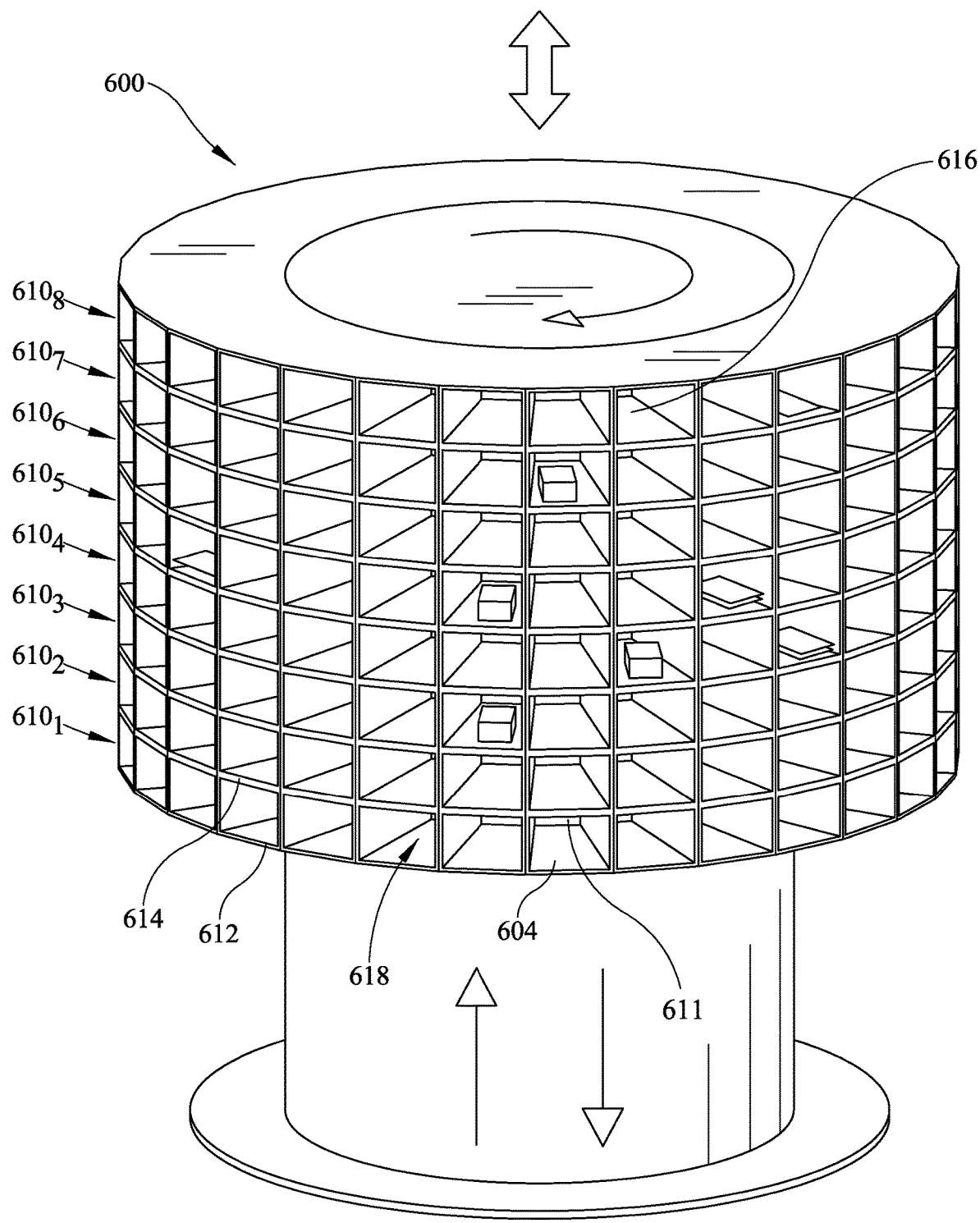
FIG. 6 is a perspective view of a revolving cluster mailbox consistent with some embodiments described herein.
Figure 7:
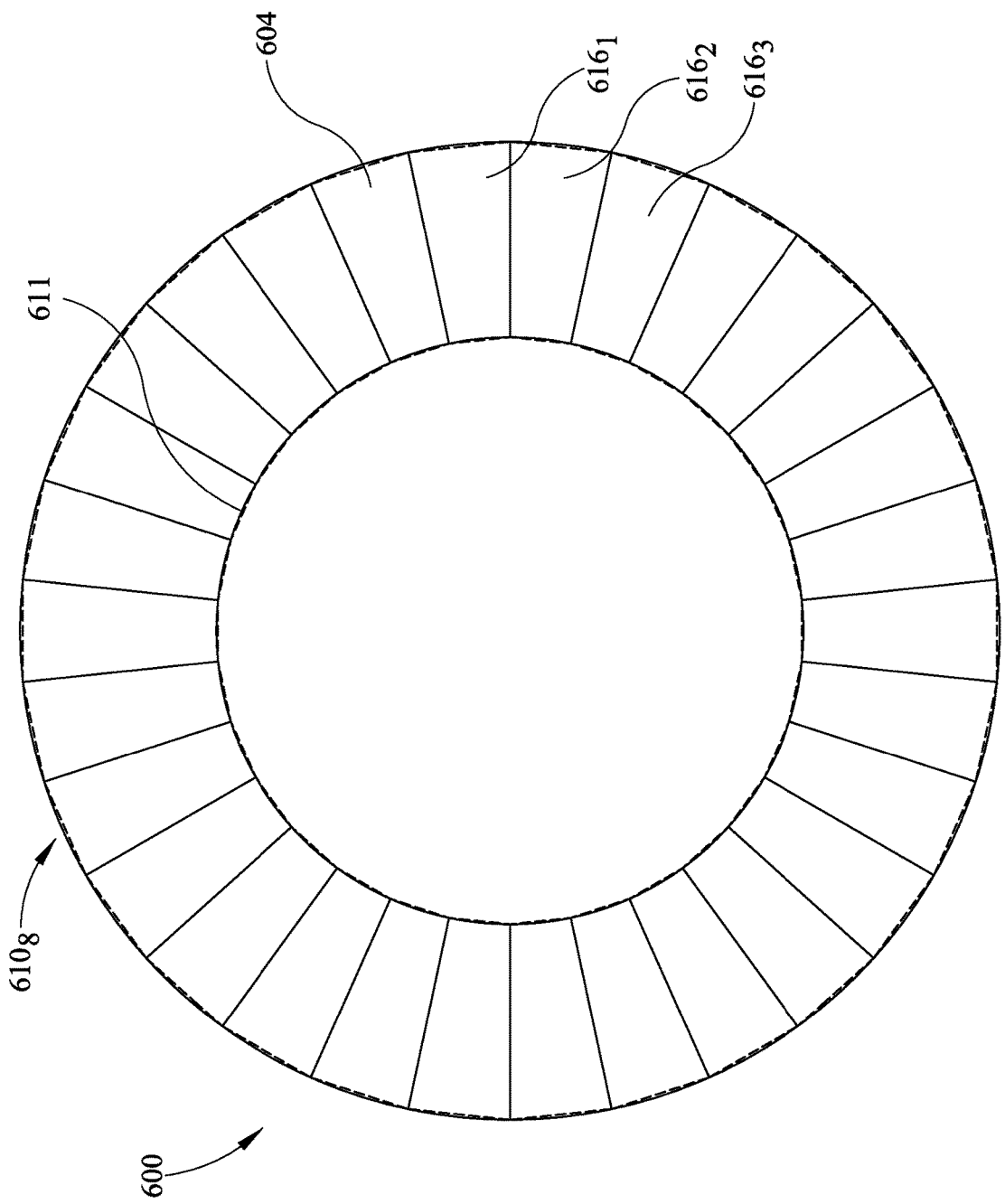
FIG. 7 is a top view of the revolving cluster mailbox of FIG. 6 consistent with some embodiments described herein.

Turning now to FIGS. 6-7, where an embodiment of a revolving cluster mailbox 600 is illustrated. The revolving cluster mailbox 600 may include a plurality of layers $610_{1-n}$ or wheels stacked vertically one on top of the other. Each layer $610_{1-n}$ may include a center ring 611, which may form the rear surface of an individual mailbox unit 604. In some embodiments, each layer $610_{1-n}$ has its own center ring 611; while in other embodiments, the center ring 611 is a cylindrical piece that extends the length of the revolving cluster mailbox 600 and forms the center ring for all of the layers $610_{1-n}$. Each layer $610_{1-n}$ may also include a bottom plate 612 and a top plate 614 forming a portion of each mailbox unit 604. In some embodiments, each layer $610_{1-n}$ may have its own bottom plate 612 and top plate 614; while in other embodiments, the top plate 614 of one layer $610_1$ may form the bottom 612 of another layer $610_2$. Each layer $610_{1-n}$ may also include a plurality of divider plates $616_{1-n}$ each configured to define a portion of the boundary of each individual mailbox unit 604. The number of divider plates $616_{1-n}$, as well as the distance between the bottom plate 612 and a top plate 614 may vary based on the number and size of individual units 604 desired.

As a non-limiting example, the revolving cluster mailbox 600 of FIGS. 6-7 may have a diameter of about 80 inches. In this non-limiting example, each layer $610_{1-n}$ may be divided into 30 individual mailbox units $604_{1-n}$ using divider plates $616_{1-n}$, such that the front opening 618 of each individual unit 604 has a width of about 8.38 inches. Furthermore, in this non-limiting illustrated embodiment, there may be about six (6) inches between the bottom plate 612 and a top plate 614. Therefore, the resulting dimensions of the opening for each unit 604 may be about 8.38 inches wide and 6 inches high. The depth of each unit 604 may vary depending on the position of the center ring 611. In the illustrated embodiment, the depth is about 16 inches, but this is not to be construed as limiting. Such a size would be sufficient to for receiving most U.S. Postal Service deliveries. A collection of layers $610_{1-n}$ stacked vertically may form the revolving cluster mailbox 600. In the illustrated embodiment, there are be eight (8) layers $610_{1-8}$ forming a revolving cluster mailbox that is about four (4) feet tall, with 240 individual mailbox units 604; however, this is not to be understood as limiting, as there may be any number of layers deemed practical.

Figure 8:
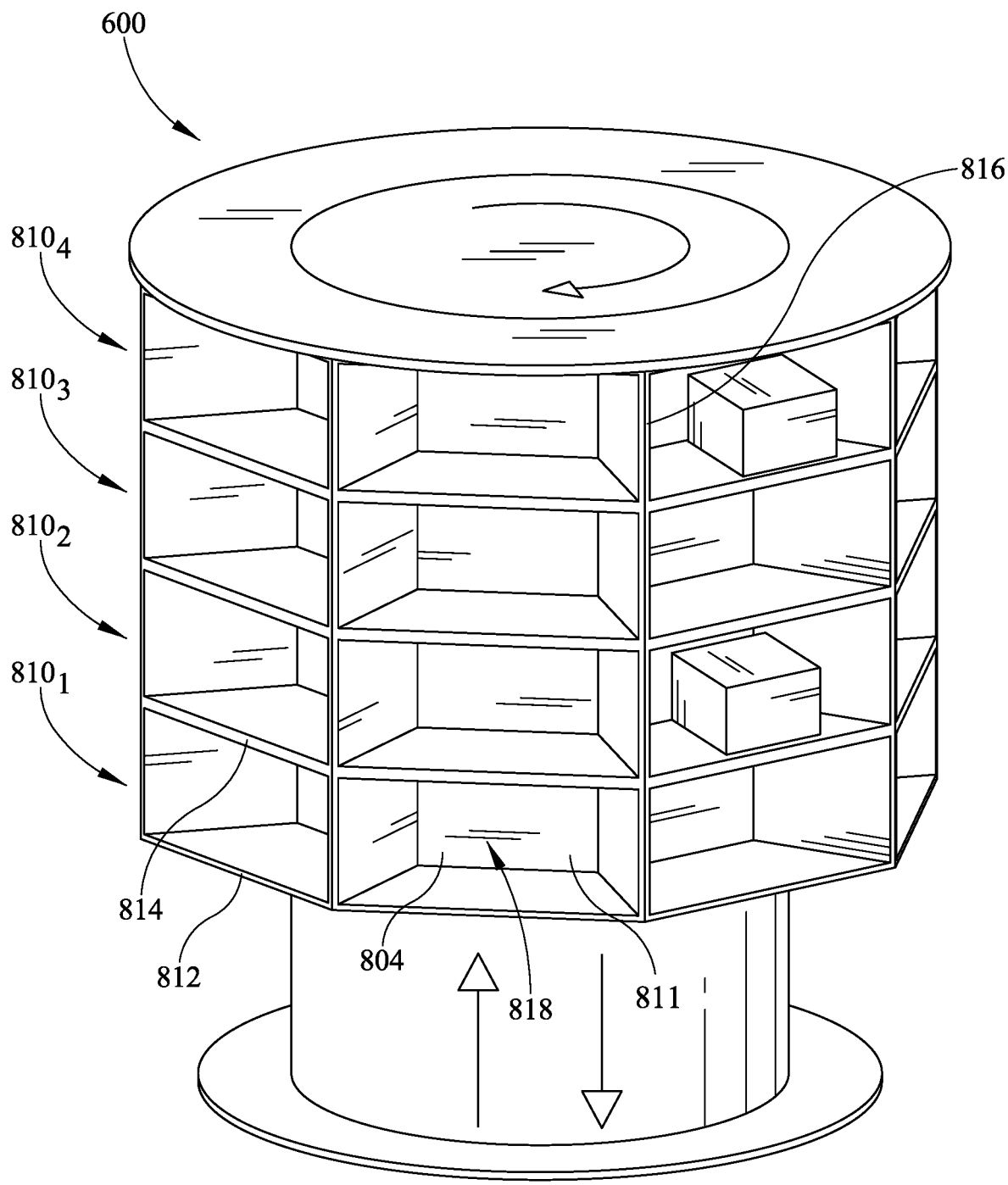
FIG. 8 is a perspective view of another revolving cluster mailbox consistent with some embodiments described herein.
Figure 9:
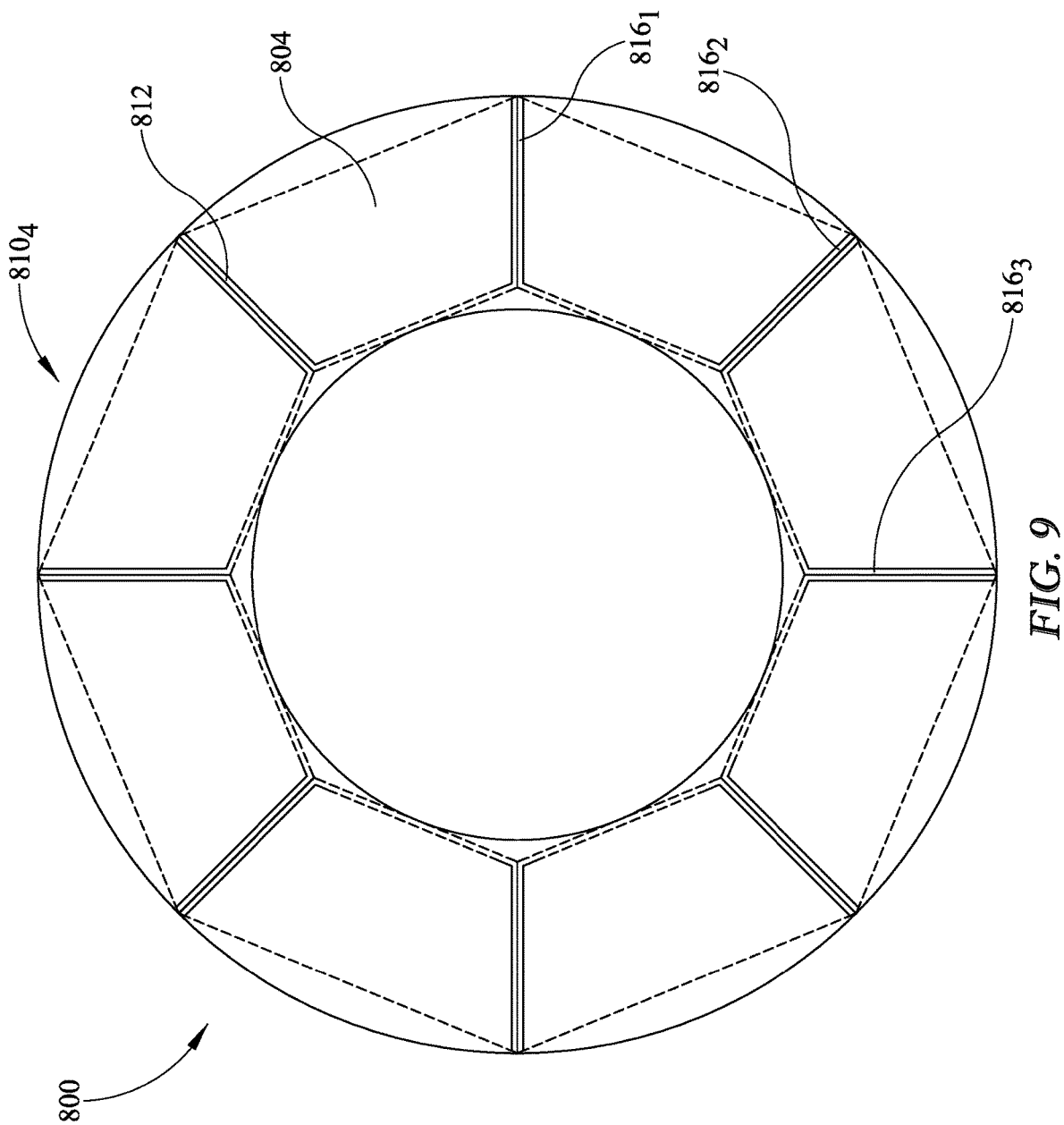
FIG. 9 is a top view of the revolving cluster mailbox of FIG. 8 consistent with some embodiments described herein.

Another non-limiting example of the revolving cluster mailbox 800 is presented in FIGS. 8-9. Similar to the embodiment in FIGS. 6-7, revolving cluster mailbox 800 may include a plurality of layers $810_{1-n}$ stacked vertically one on top of the other. Each layer 810 may include a center ring 811, which may form the rear surface of an individual mailbox unit 804. In some embodiments, each layer 810 has its own center ring 811; while in other embodiments, the center ring 811 is a cylindrical piece that extends the length of the revolving cluster mailbox 800 and forms the center ring for all of the layers $810_{1-n}$. Each layer $810_{1-n}$ may also include a bottom plate 812 and a top plate 814 forming a portion of each mailbox unit 804. In some embodiments, each layer 810 may have its own bottom plate 812 and top plate 814; while in other embodiments, the top plate 814 of one layer $810_1$ may form the bottom 812 of another layer $810_2$. Each layer $810_{1-n}$ may also include a plurality of divider plates $816_{1-n}$ each configured to define a portion of the boundary of each individual mailbox unit 804. Also similar to the embodiment illustrated in FIGS. 6-7, revolving cluster mailbox 800 may have a diameter of about 80 inches; however this is not intended to be limiting.

Each layer $810_{1-n}$ may be divided into 8 individual mailbox units $804_{1-n}$ using divider plates $816_{1-n}$, such that the front opening 818 of each individual unit 804 has a width of about 31.42 inches. Furthermore, in the non-limiting illustrated embodiment, there may be about 14 inches between the bottom plate 812 and a top plate 814. Therefore, the resulting dimensions of the opening for each unit 804 may be about 31.42 inches wide and 14 inches high. The depth of each unit 804 may vary depending on the position of the center ring 811. In the illustrated embodiment, the depth is about 16 inches, but this is not to be construed as limiting. Such a size would be capable of receiving most standard size parcels. For example, the standard package sizes for the United Parcel Service are: 12.75 inches by 16 inches by 0.75 inches; 13 inches by 11 inches by 2 inches; 16 inches by 11 inches by 3 inches; and 18 inches by 13 inches by 3 inches. The collection of layers $810_{1-n}$ stacked vertically may form the revolving cluster mailbox 800; in the illustrated embodiment, there may be four (4) layers $810_{1-4}$ forming a revolving cluster mailbox that is about four (4) feet tall, with 32 individual mailbox units 804.

Figure 10:
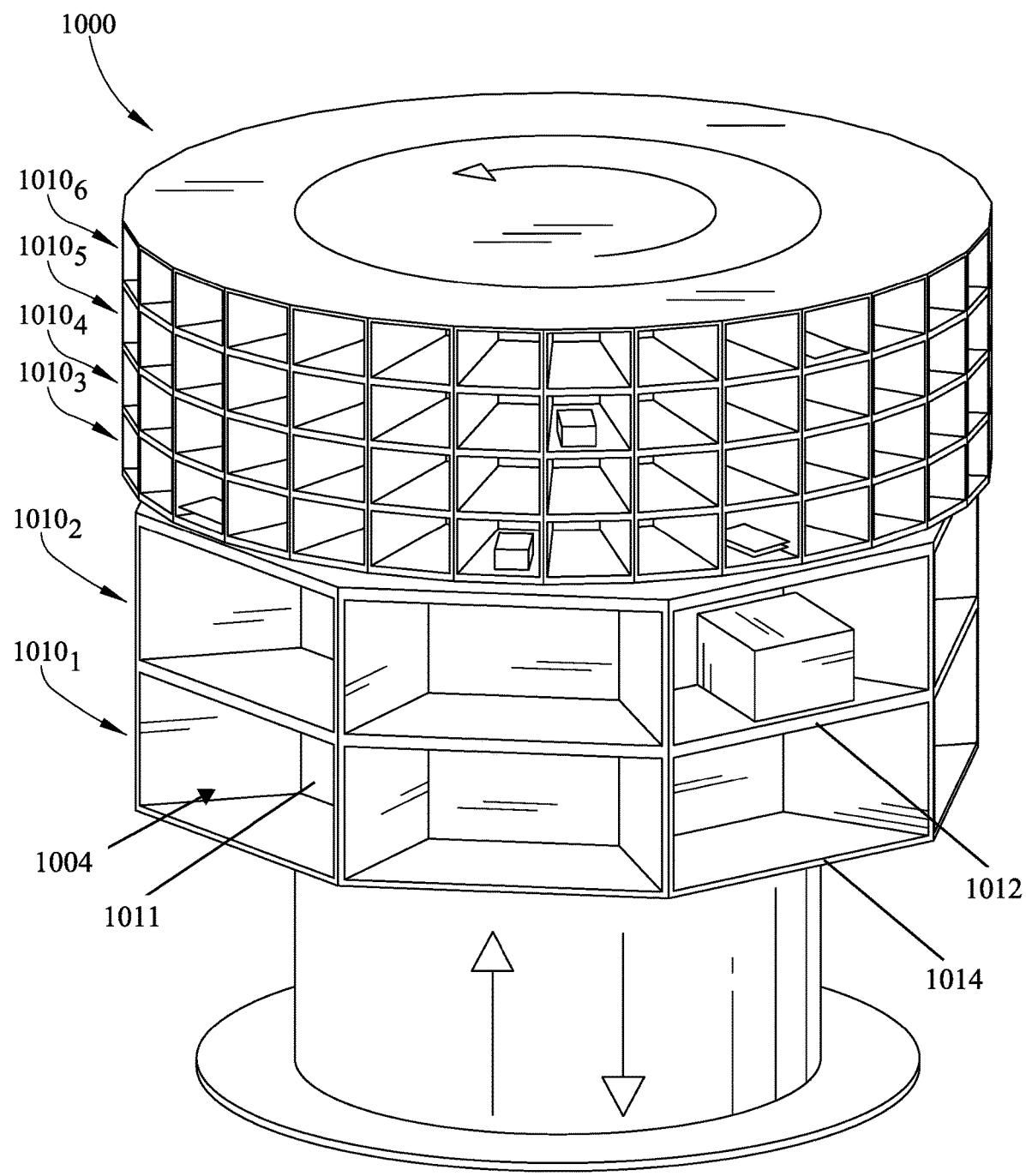
FIG. 10 is a perspective view of another revolving cluster mailbox consistent with some embodiments described herein.

Turning now to FIG. 10, where yet another non-limiting example of a revolving cluster mailbox 1000 is presented. Similar to previous embodiments, revolving cluster mailbox 1000 include a plurality of layers $1010_{1-n}$ stacked vertically one on top of the other. Each layer $1010_{1-n}$ may include a center ring 1011, similar to those previously described, as well as a bottom plate 1012 and a top plate 1014 forming a portion of each mailbox unit 1004. Each layer $1010_{1-n}$ may also include a plurality of divider plates $1016_{1-n}$ each configured to define a portion of the boundary of each individual mailbox unit 1004. However, unlike the embodiments described with reference to FIGS. 6-9, the layers $1010_{1-n}$ may vary in size. For example, as illustrated layers $1010_1$ and $1010_2$ may include eight (8) individual mailbox units 1004, each about 31.42 inches wide and 14 inches high; while layers $1010_{3-6}$ may include 30 individual mailbox units 1004, each 8.38 inches wide and 6 inches high. The number of individual units, along with their sizes and dimensions are merely exemplary and may vary; a person of skill in the art would recognize any number of possible combinations.

Regardless of the number and size of the individual mailbox units 204, 604, 804, 1004, each revolving cluster mailbox 200, 600, 800, 1000 described herein may include a plurality of motors. For example, a first motor in each revolving cluster mailbox 200, 600, 800, 1000 may be configured to power vertical movement (e.g. raise and lower) of the revolving cluster mailbox 200, 600, 800, 1000 (as illustrated by arrows in FIGS. 6, 8, and 9). A second motor in each revolving cluster mailbox 200, 600, 800, 1000 may be configured to power rotational movement of the revolving cluster mailbox 200, 600, 800, 1000 (as illustrated by arrows in FIGS. 6, 8, and 9). In some instances, the first and second motors may be a step motor. In such instances, the step motor may include a home position switch for the reading the position of the revolving cluster mailbox 200, 600, 800, 1000. However, these motors are not limited to step motors, as other types of motors may also be utilized. In other instances, the motors may be hydraulically actuated.

These motors, in combination with a controller (described with reference to FIG. 5) allow a user to approach the shelter 100, interact with an interface, and the revolving mailbox cluster 200, 600, 800, 1000 to move so that a user can access a particular mailbox containing their mail, parcels, etc. without exiting their vehicle. In some instances, this interaction may be through a keypad, touchscreen, or the like at the window. In other instances, this interaction may be through a remote control. This remote control may use a transmitter (the remote itself) and a receiver which signals which individual mailbox unit 204, 604, 804, 1004 the user wishes to access. In still other instances, this interaction may be through a scanner, code reader, or the like; in such instances, a wireless signal may sent as to which individual mailbox unit 204, 604, 804, 1004 the user wishes to access. In some instances, this receiver or scanner may be considered the user interface. These interfaces may be used in combination, for example, in some instances, carriers for the United States Postal Service (USPS) may utilize a transponder/receiver as described herein, while carriers for parcel services (e.g. UPS, FedEx, Amazon, etc.) may utilize a scanner or code reader. In some embodiments, such as illustrated throughout, the shelter 100 may accessed controlled such that each individual mailbox unit 204, 604, 804 of the revolving mailbox clusters 200, 600, 800, 1000 need not include a keyed door; thus, a user is able to access their mail, parcels. In other embodiments, the individual mailbox unit 204, 604, 804 of the revolving mailbox clusters 200, 600, 800, 1000 may include an access door that a user may open to retrieve their mail, parcels, etc.; the use of an access door may be particularly important where access to the revolving mailbox clusters 200, 600, 800, 1000 is not limited through, for example, an enclosed shelter 100.

Figure 11:
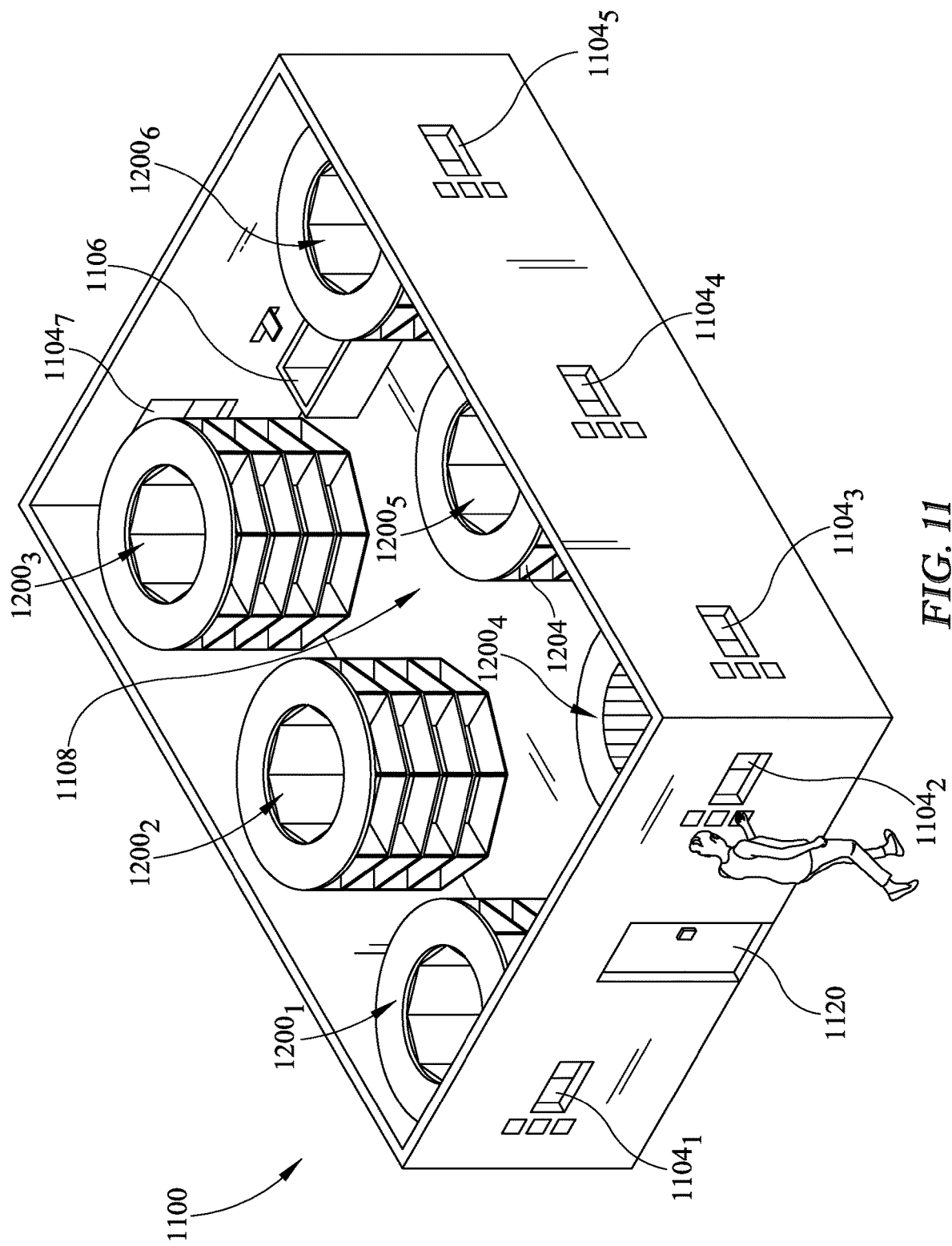
FIG. 11 is a perspective view of a mail room containing a plurality revolving cluster mailboxes and central package delivery systems consistent with some embodiments described herein.
Figure 12:
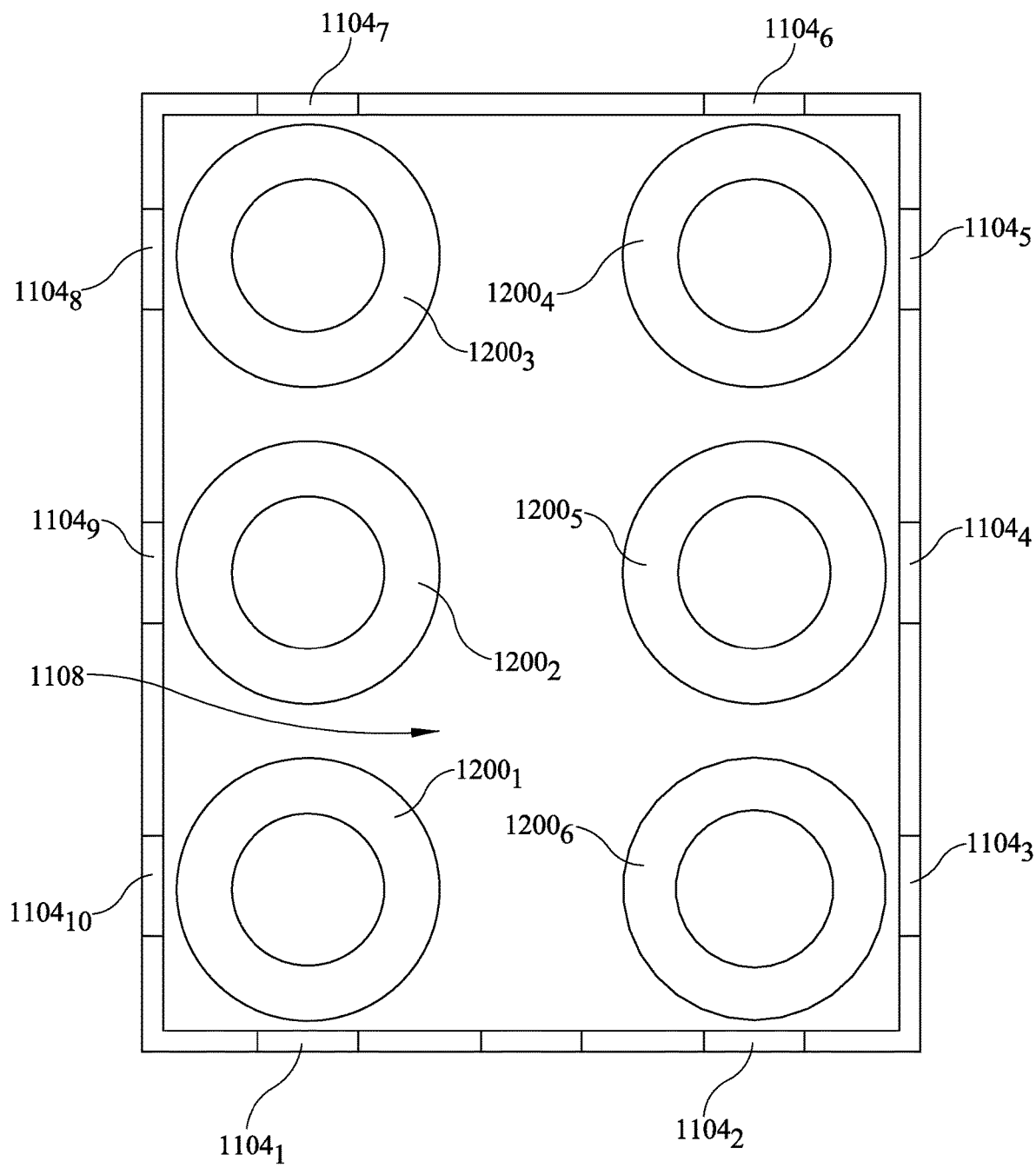
FIG. 12 is a top view of the mail room and revolving cluster mailboxes and central package delivery systems contained therein of FIG. 11 consistent with some embodiments described herein.

Turning now to FIGS. 11-12, a mail room 1100 containing at least one revolving cluster mailbox $1200_{1-n}$ is illustrated. Such a mail room 1100 may be desirable where a "drive-up" shelter is impractical, for example in an apartment community, high rise apartment or condominium building, or the like. Similar to the "drive-up" shelter described with reference to FIGS. 1-4, the mail room 1100 may include at least one openable window $1104_{1-n}$. In some instances, the mail room 1100 may include a user access window $1104_{1-n}$ for each revolving cluster mailbox $1200_{1-n}$. In some embodiments, the window $1104_{1-n}$ may slide horizontally from side to side to open; while in other embodiments, the window $1104_{1-n}$ may slide vertically up and down to open. The mail room 1100 may also include a drop box 1106 where users may deposit outgoing mail. The mail room may also include an access door 1120 to provide access to a loading zone 1108, such that postal service or various delivery company personnel have access to the loading zone 108 to load the mail, parcels, etc. into individual mailbox units 1204.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A revolving cluster mailbox, comprising:
   a plurality of layers stacked vertically, wherein a second layer sits atop a first layer, and wherein each of the plurality of layers includes:
     a bottom plate and a top plate, wherein the bottom plate and the top plate are vertically opposed;
     at least one divider plate that is perpendicular to the bottom and the top plate; and
     a center portion;
     wherein the bottom plate, the top plate, the at least one divider plate, and the center portion define a plurality of individual mailbox units, each individual mailbox unit with an opening disposed opposite the center portion;
   a first motor which moves the plurality layers vertically; and
   a second motor which rotates the plurality of layers.

2. The revolving cluster mailbox of claim 1 further comprising:
   a user interface; and
   a controller coupled to the first and second motors and configured to activate the first or second motors in response to an input to the user interface.

3. The revolving cluster mailbox of claim 2, wherein the user interface is a touchscreen.

4. The revolving cluster mailbox of claim 2, wherein the user interface is a keypad.

5. The revolving cluster mailbox system of claim 2, wherein the input to the user interface is a signal from a remote device.

6. The revolving cluster mailbox system of claim 3, wherein the controller is configured to:
   receive, from the remote device, a signal; and
   activate the first or second motors in response to the signal received from the remote device.

7. The revolving cluster mailbox of claim 1, wherein the first and second motors are step motors.

8. The revolving cluster mailbox of claim 1, wherein the first and second motors are hydraulically actuated.

9. The revolving cluster mailbox of claim 1, wherein each one of the plurality of layers stacked vertically are substantially circular.

10. The revolving cluster mailbox of claim 1, wherein the plurality of individual mailbox units includes a first plurality of individual mailbox units of a first size and a second plurality of individual mailbox units of a second, different size.

11. The revolving cluster mailbox of claim 1 further comprises a drop box configured to receive outgoing mail.

* * * * *